May 1, 1934.  E. D. HARRINGTON  1,957,207

OIL BURNER ELECTRICAL IGNITION

Filed Sept. 16, 1929

Inventor:
Elliott D. Harrington
by Charles E. Tullar
His Attorney.

Patented May 1, 1934

1,957,207

UNITED STATES PATENT OFFICE 1,957,207

OIL BURNER ELECTRICAL IGNITION

Elliott D. Harrington, Schenectady, N. Y., assignor to General Electric Company, a corporation of New York Application September 16, 1929, Serial No. 393,028

12 Claims. (Cl. 175—115)

My invention relates to ignition devices, more particularly to ignition devices for oil burners.

The invention has for its object an ignition device for oil burners wherein the oil is atomized to form a combustible mixture and more particularly to a device which will insure ignition by receiving unvaporized oil, vaporizing it, and igniting it by raising it to ignition temperature.

From a practical viewpoint, the only form of electric ignition which has been successful to date is the spark type of ignition and with this form the field is limited, since there are certain types of burners representing a very large proportion of the oil burner field which cannot be satisfactorily ignited with spark ignition because of coarse atomizing. These burners are often referred to as a "spinner" or "rotating cup" type of burner and produce in atomization a mist of fine particles of oil but not fine enough to be readily ignited by spark. The ignition of this type of burner has been practically confined to gas or gas-electric ignition. The result has been that the field of application has been restricted to points where gas for ignition purposes is available.

It has also been found that when the electrodes for the spark gap are placed in the blast of the vaporized fuel of an oil burner the air blast tends to blow out the arc and even if the arc continues the gases pass by the arc so rapidly that they are not raised to the ignition temperature before they are out of range.

Further disadvantages of the electric ignition in its present form are a tendency toward high voltage break-down, burning of electrodes, plugging of the electrode gap, personal hazard and radio interference. It is the object of the present invention to overcome the above enumerated difficulties as well as to insure positive ignition of the vaporized oil.

The preferred embodiment of the invention consists of a resistor, a portion of which is formed with a depression or cup protected from the direct blast of the atomizer into which unvaporized oil will flow and a restricted portion which provides a hot spot by means of which the vaporized oil is ignited. The oil which is received by the cup is vaporized by the heated resistor. The resistor to be most effective is protected by a shield from the direct blast of the atomizer which is used in the oil burner.

The resistor is heated by means of a constant current step-down transformer the low voltage of the secondary terminals of the transformer being connected to the resistor. A motor is used to drive the atomizer and the transformer is connected to the same circuit as the motor operating the spray.

The drawing illustrates a preferred embodiment of the invention.

Figure 1:
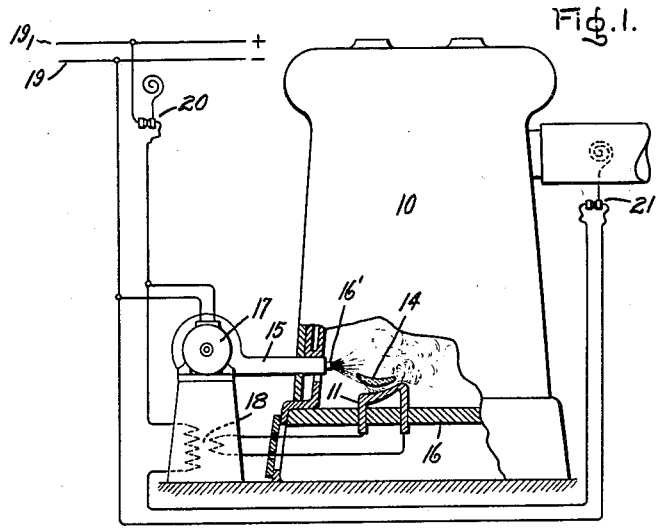
Fig. 1 is a diagrammatic showing of the igniter and the associated apparatus.

Referring to Fig. 1, 10 designates an oil burner furnace in the base 16 of which is mounted the resistor 11 connected to the low voltage windings of a constant current transformer 18. 14 designates the shield of refractory or other material. 17 designates the motor operating the atomizer 15 which is provided with a nozzle 16' for producing a spray of atomized oil. The motor 17 and transformer 18 are connected to the lines 19 and $19_1$. 20 designates a room thermostat to stop operation of the burner when the proper temperature is reached and 21 a stack thermostat to open the igniter circuit.

Figure 2:
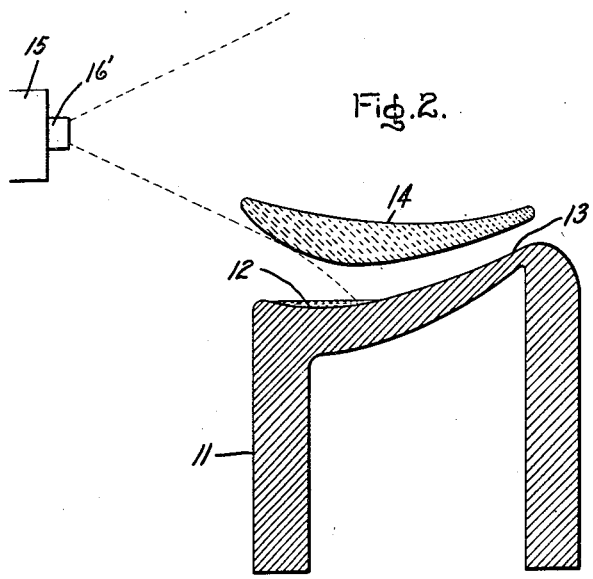
Fig. 2 is a cross-section of a view of the igniter element and guard.
Figure 3:
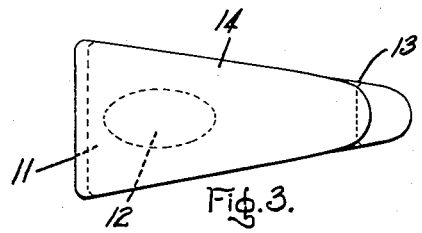
Fig. 3 is a plan view of the igniter and guard.

Referring to Figs. 2 and 3, 12 designates the cup portion of the resistor 11 and 13 the restricted portion which provides the hot spot for igniting the atomized fuel. The shield 14 protects the hot spot from the direct blast of the atomizer.

In operation the atomizer 15 produces a spray of atomized oil. Part of the spray is deflected into the cup portion 12. The cup portion 12 of the resistor 11 is heated to a high enough temperature to vaporize the oil collected therein. This oil vaporized at 12 then travels over the hot spot 13 almost entirely or entirely by natural draft, and becomes ignited thereby, in turn igniting the atomized oil.

When the gases in furnace 10 reach a predetermined temperature thermostat 21 in the stack opens the transformer circuit thus extinguishing the igniter. When the proper room temperature is reached thermostat 20 opens the circuit to the motor as well as the transformer. When the stack gases cool sufficiently the thermostat 21 located therein closes the transformer circuit through it, but the transformer is not energized until the room temperature has fallen to a point where thermostat 20 closes, connecting motor and transformer to the lines.

From the above description of the present invention it will be seen that an igniter element has been devised which will insure positive ignition of the atomized oil. The burning of the electrodes as well as the clogging of the same is eliminated by the present invention. Due to the low voltage necessary to heat element 11 personal hazard is reduced to a minimum and because of lack of high frequencies the question of radio interference is no longer present.

What I claim as new and desire to secure by Letters Patent of the United States is:

1. An igniter element for an oil burner comprising a resistor having portions thereof at different temperatures, a portion at one temperature to vaporize oil and a portion at a higher temperature to ignite oil vapor.

2. An igniter comprising a cup shaped resistor, having a raised portion of restricted cross section to provide a hot spot.

3. An oil burner igniter comprising a resistor having a wide cup portion formed to receive and vaporize oil and a raised portion of restricted cross section to provide a hot spot to ignite oil vapor.

4. An oil burner igniter comprising an electrical resistor having portions at different temperatures, a cup shaped portion at one temperature formed to receive and vaporize oil and a restricted portion at a higher temperature to form a hot spot to ignite vaporized oil.

5. An oil burner igniter comprising a triangular shaped resistor having a wide cup portion formed to receive and vaporize oil and a raised portion of restricted cross section to provide a hot spot to ignite oil vapor, and a shield for said ignitor.
said igniter.

6. An igniter for an oil burner having a motor driven atomizer, said igniter comprising a resistor element adapted to be connected to a transformer and be heated thereby and having one portion at one temperature to vaporize oil received by the element and another portion at a higher temperature to ignite the vaporized oil.

7. An igniter for an oil burner having a motor driven atomizer, said igniter including a resistor adapted to be connected to the low voltage windings of a transformer to be heated thereby said resistor being provided with a cup shaped portion to receive and vaporize oil and a restricted portion to provide a hot spot to ignite atomized oil, and a guard to protect said resistor from the direct blast of the atomizer to insure proper ignition.

8. A fuel igniter comprising an electrically heated resistor having a relatively low temperature portion for heating the fuel and a relatively high temperature portion for igniting the fuel.

9. A fuel igniter comprising an electrically heated resistor having a portion of relatively large cross-section for heating the fuel and having another portion of restricted cross-section to provide a hot spot for igniting the heated fuel.

10. A fuel igniter comprising an electrical resistor having terminal portions and having a portion of restricted cross section to provide a hot spot adjacent another portion of larger cross-section intermediate said terminal portions.

11. An igniter comprising a resistor having a substantially triangularly shaped top portion for vaporizing and igniting fuel with terminal portions extending from the apex and base thereof.

12. An igniter for an atomized oil blast comprising an electrically heated resistor element adapted to be located adjacent the bottom of the blast and having a relatively low temperature portion for vaporizing the atomized oil falling thereon and a relatively high temperature portion for igniting the vaporized oil, and a shield for preventing the atomized oil blast from cooling the high temperature portion.

ELLIOTT D. HARRINGTON.